G. W. FISHER.
Improvement in Hydrants.
No. 127,587.  Patented June 4, 1872.
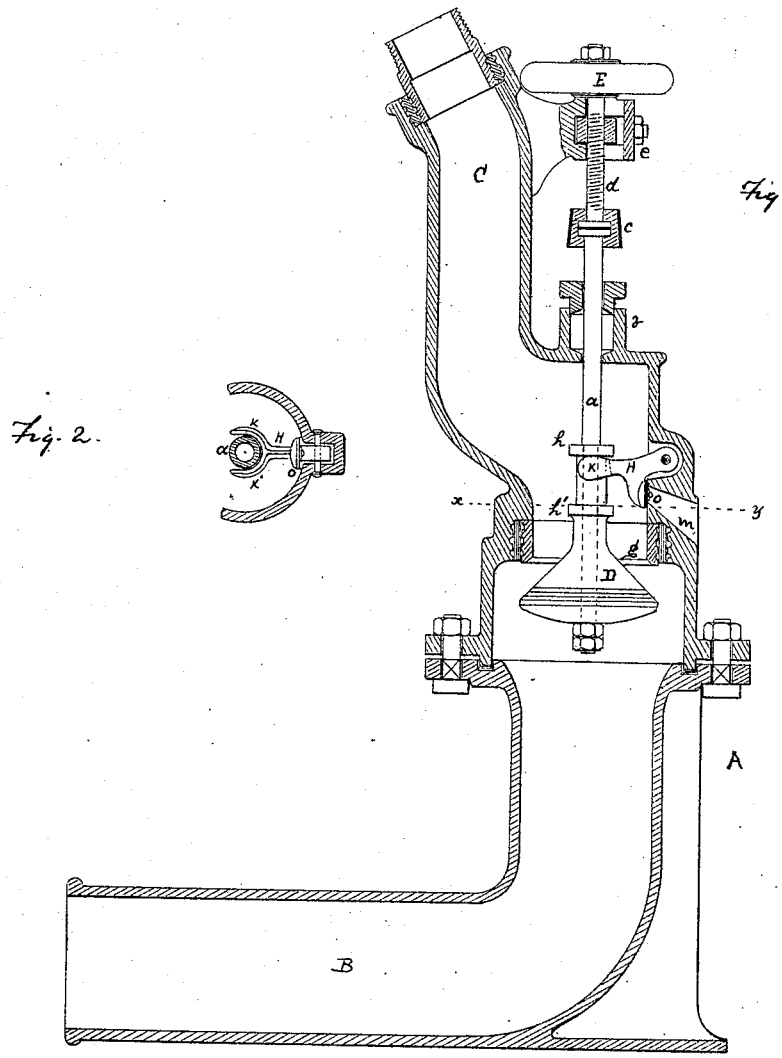

127,587

UNITED STATES PATENT OFFICE.

GEORGE W. FISHER, OF ST. LOUIS, MISSOURI, ASSIGNOR TO GERARD B. ALLEN & CO., OF SAME PLACE.

IMPROVEMENT IN HYDRANTS.

Specification forming part of Letters Patent No. 127,587, dated June 4, 1872.

*To all whom it may concern:*

Be it known that I, GEORGE W. FISHER, of the city and county of St. Louis, State of Missouri, have invented a new and useful Improvement in Hydrants, of which the following is a full, clear, and exact description, reference being had to the annexed drawing making a part of this specification, in which—

Figure 1 represents a vertical section of a hydrant having my improvement attached. Fig. 2 represents a transverse section of a portion of Fig. 1 at the line $x\ y$.

Similar letters indicate like parts.

The object of my invention is to provide an attachment for hydrants which shall operate to draw off the water in the hydrant above the valve, controlling the water-supply thereof as soon as such valve is closed, thus in a great measure obviating the danger of freezing.

A, Fig. 1, represents the hydrant, having an inlet-pipe, B, and an outlet-pipe, C. D is a valve, the stem of which, $a$, Figs. 1, 2, passes through a stuffing-box, $b$, and then, by means of the coupling $c$, is connected with the screw $d$, which has its bearings in a projection, $e$, from the hydrant, and is operated by the wheel E in such manner as to open or close the valve, the seat of which is at $g$. On the stem $a$ are two collars, $h\ h'$, between which and encircling the stem play the forked arms $k$, Fig. 1, $k\ k'$, Fig. 2, of the bell-crank H pivoted as seen in the side of the hydrant. On this crank is a valve, $o$, which closes the opening $m$ in the side of the hydrant. As shown in the drawing, the valve D is open and the collar $h$ presses on the end of the crank H, effectually closing the outlet $m$. Now, when the stem is raised so as to close the valve D, the collar $h'$ engages with the crank, lifting it, and thus opens the valve $o$, which allows all the water in the hydrant above the valve D to escape through the opening $m$. It is evident that the connection between the crank and the valve-stem may be varied from that shown—as, for instance, the crank may have a single arm playing in a slot in the stem—and consequently I do not desire to limit myself to the particular mode of connection shown, as, in order to attain the object I seek, it is only necessary to have such a connection between valve and stem as that the latter shall trip the former in the manner shown and described.

I of course do not claim any novelty in the construction of the hydrant or the mode of operating the valve D; but merely claim as my invention, and desire to secure by Letters Patent—

The combination of the valve $o$, crank H, stem $a$, collars $h\ h'$, with the hydrant A, all constructed and arranged substantially as and for the purpose shown and specified.

GEO. W. FISHER.

Witnesses:
SAML. S. BOYD,
C. M. WHITNEY.